Figure 1:
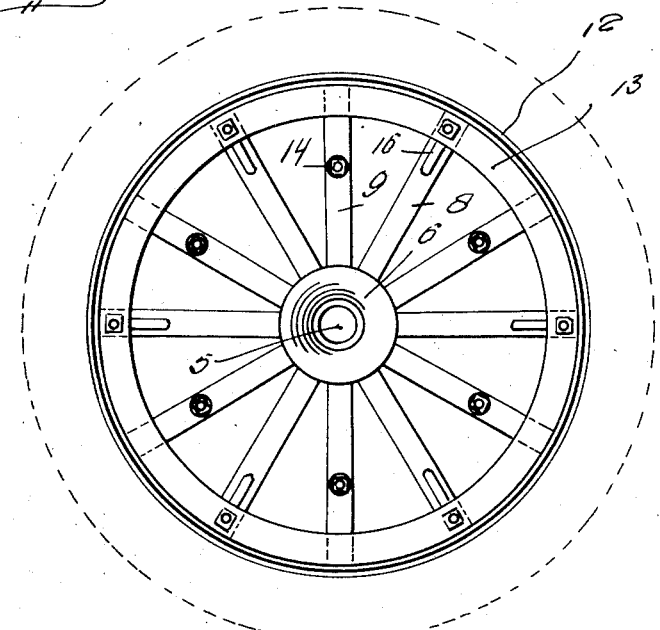

Oct. 30, 1928.

H. POUNDS 1,689,968

WHEEL CONSTRUCTION

Filed June 14, 1927

Inventor
Hoyle Pounds

By Clarence A O'Brien
Attorney

Patented Oct. 30, 1928.

1,689,968

UNITED STATES PATENT OFFICE.

HOYLE POUNDS, OF WINTER GARDEN, FLORIDA.

WHEEL CONSTRUCTION.

Application filed June 14, 1927. Serial No. 198,749.

The present invention relates to a wheel construction for trucks, tractors, and the like and has for its object to provide a plurality of rims for receiving a plurality of tires of the pneumatic or like or any other suitable type.

Another important object of the invention lies in a novel manner of mounting the rims in respect to the hub.

A still further object of the invention resides in the provision of a wheel of this nature which is comparatively simple in its construction, inexpensive to manufacture, very efficient and reliable in use, strong and durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
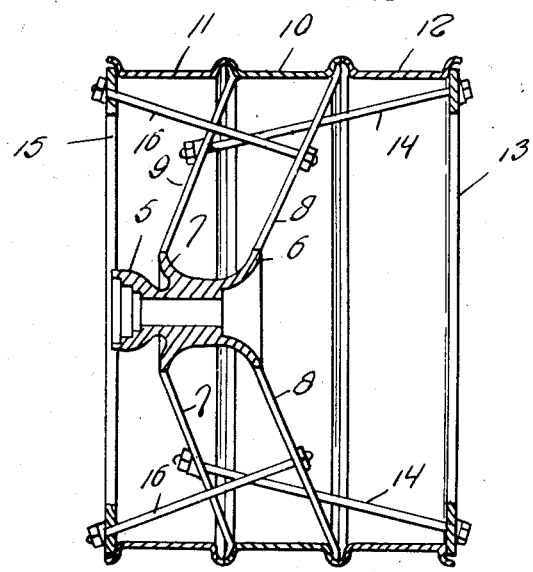

Figure 1 is a side elevation of the wheel embodying the features of my invention, Fig. 2 is a sectional view therethrough.

Referring to the drawing in detail it will be seen that the numeral 5 denotes a hub having a pair of annular flanges 6 and 7 with spokes 8 and 9 respectively radiating therefrom. These spokes are inclined outwardly from the hub as is clearly illustrated in Figure 2. The spokes have formed integrally or otherwise attached to their outer ends a tire rim 10. The numerals 11 and 12 denote two additional tire rims, one on each side of the rim 10. A ring 13 has bolts 14 extending therethrough and engaged with intermediate portions of the spokes 9. This ring engages the outer edge of the rim 12. A ring 15 has bolts 16 engaged therewith and engaged with intermediate portions of the spokes 8 and the ring 15 engages the outer edge of the rim 11. These bolts 14 and 16, therefore, hold the rims 11 and 12 concentric with the rim 10 and as a unit therewith. The bolts 16 and 14 have detachable connections with the rings and with their respective spokes as is quite apparent from an inspection of the drawing. Thus the rims 11 and 12 are quick detachable and the bolts 16 and 14 function as stress distributing elements.

From the above detailed description it will be seen that I have devised an exceedingly simple wheel construction wherein the parts may be quickly and readily assembled or disassembled. The spokes, the bolts, and the rings distribute the stresses evenly and cause the assembly to provide a very rigid structure.

It is thought that the construction, utility, and advantages of this invention will now be apparent to those skilled in this art and that changes in details of construction and in the combination and arrangement of parts may be resorted to without departing from the spirit or scope of the invention as hereinafter claimed or sacrificing any of its advantages.

Having thus described my invention what I claim as new is:—

1. A wheel structure of the class described comprising a hub, spokes radiating from the hub, said spokes being disposed in series, a rim at the ends of the spokes, a pair of additional rims, a pair of rings for engaging the outer edges of the additional rims to hold them in concentric abutting relation with the first mentioned rim, and means engaging the rings with the spokes.

2. A wheel structure of the class described comprising a hub, spokes radiating from the hub, said spokes being disposed in series, a rim at the ends of the spokes, a pair of additional rims, a pair of rings for engaging the outer edges of the additional rims to hold them in concentric abutting relation with the first mentioned rim, and bolts having detachable connection with the rings and spokes for holding the parts assembled.

3. A wheel structure comprising an intermediate wheel including a hub, spokes extending radially from the hub at the inner and outer end portions thereof, a flanged tire supporting rim to which the outer ends of the radial spokes are secured, additional tire supporting rims disposed on the opposite sides of the intermediate wheel, and means for securing the outer rims to the wheel.

4. A wheel structure comprising a central rim adapted to receive a tire, a hub therefor and a spoke structure connecting the hub to said central rim, two additional outside rims each adapted to receive a tire and arranged in the same plane with the central rim, each of these outside rims having its inner edge in abutting relation with the adjacent edge of the central rim, and means for holding the outside rims against the central rim, said means being anchored in the spoke structure of the central rim.

5. A wheel structure comprising a central rim adapted to receive a tire, a hub therefor and a spoke structure connecting the hub to said central rim, two additional outside rims each adapted to receive a tire and arranged in the same plane with the central rim, each of these outside rims having its inner edge in abutting relation with the adjacent edge of the the central rim, and means for holding the outside rims against the central rim, said means embodying bolt-rods extending inwardly from the outer edge of each of the rims and having their inner ends anchored in said spoke structure.

6. A wheel structure comprising a central rim adapted to receive a tire, a hub therefor and a spoke structure connecting the hub to said central rim, two additional outside rims, each adapted to receive a tire and arranged in the same plane with the central rim so that the tires attached to the rims shall all lie in the same plane, and means for holding these outside rims in the same plane with the central rim, said means being anchored in the spoke structure of the central rim.

7. A wheel structure comprising a central rim adapted to receive a tire, a hub therefor and a spoke structure connecting the hub to said central rim, two additional outside rims, each adapted to receive a tire and arranged in the same plane with the central rim so that the tires attached to the rims shall all lie in the same plane, and means for holding these outside rims in the same plane with the central rim, said means being anchored in the spoke structure of the central rim and consisting of bolt-rods extending inwardly from the outer edge of each of the outside rims and having their inner ends attached to said spoke structure.

8. A wheel structure comprising a central wheel embodying a hub, a rim flanged at its edges to receive a tire, two series of radial spokes one at each end of the hub and extending to and connected to the adjacent flanged edges of said rim, two additional outside rims each flanged to receive a tire and arranged in the same plane with the central rim, and means for supporting these two outside rims on the central wheel embodying bolt-rods extending inwardly from the outer edge of each of said outside rims and having their inner ends attached to the spokes of the central wheel at the opposite side.

In testimony whereof I affix my signature.

HOYLE POUNDS.